(12) United States Patent
Shlomai et al.

(10) Patent No.: US 9,342,329 B2
(45) Date of Patent: May 17, 2016

(54) METHOD AND SYSTEM FOR CROSS-OPERATING SYSTEMS EXECUTION OF SOFTWARE APPLICATIONS

(71) Applicant: BLACKBERRY LIMITED, Waterloo (CA)

(72) Inventors: Netzer Shlomai, Ra'anana (IL); Udi Lavin, Ra'anana (IL); Amos Lahav, Tel Mond (IL); Shay Ben Hayun, Geulim (IL)

(73) Assignee: BlackBerry Limited, Waterloo, Ontario (CA)

(*) Notice: Subject to any disclaimer, the term of this patent is extended or adjusted under 35 U.S.C. 154(b) by 130 days.

(21) Appl. No.: 13/720,093

(22) Filed: Dec. 19, 2012

(65) Prior Publication Data

US 2013/0326513 A1 Dec. 5, 2013

Related U.S. Application Data

(60) Provisional application No. 61/577,877, filed on Dec. 20, 2011.

(51) Int. Cl.
*G06F 9/455* (2006.01)

(52) U.S. Cl.
CPC ............ *G06F 9/455* (2013.01); *G06F 9/45537* (2013.01)

(58) Field of Classification Search
None
See application file for complete search history.

(56) References Cited

U.S. PATENT DOCUMENTS

| | | |
|---|---|---|
| 2006/0136912 A1 | 6/2006 | Robinson et al. |
| 2007/0094372 A1* | 4/2007 | Hariharan et al. ............ 709/223 |
| 2008/0016155 A1 | 1/2008 | Khalatian |
| 2009/0254899 A1* | 10/2009 | Shlomai et al. ............... 717/174 |
| 2010/0094838 A1* | 4/2010 | Kozak ........................... 707/705 |
| 2012/0066333 A1* | 3/2012 | Browning et al. ............ 709/212 |

OTHER PUBLICATIONS

Office Action dated Nov. 19, 2015, received for U.S. Appl. No. 14/016,810.

\* cited by examiner

*Primary Examiner* — Mengyao Zhe
(74) *Attorney, Agent, or Firm* — Donna Flores; Fleit Gibbons Gutman Bongini & Bianco P.L.

(57) ABSTRACT

A method for cross-operating systems execution of a legacy software application on a user computing device is provided. The method comprises upon launching a native application on the user computing device, executing, on a server, a cloudified application corresponding to the legacy software application, the legacy software application is compliant with a first operating system, wherein the user computing device is compliant with a second operating system, the first operating system and the second operating system are incompatible with each other; rendering outputs responsive of inputs generated by the native application and received at the cloudified application; streaming the rendered outputs to the user computing device to be displayed by the native application; and performing file system operations requested by at least one of the native application and the cloudified application on at least a cloud storage service.

19 Claims, 6 Drawing Sheets

METHOD AND SYSTEM FOR CROSS-OPERATING SYSTEMS EXECUTION OF SOFTWARE APPLICATIONS

CROSS REFERENCE TO RELATED APPLICATIONS

This application claims the benefit of U.S. provisional patent application No. 61/577,877, filed Dec. 20, 2011, the contents of which are incorporated herein by reference.

TECHNICAL FIELD

The present invention relates generally to application virtualization, and more particularly to a method and a system for enabling the execution of a software application designed for a first type of operating system (OS) on a second type of operating system.

BACKGROUND

Personal computers (PCs) traditionally have been used to execute a multitude of software applications, features and functions. The applications provide the user with tools to accomplish tasks, such as, but not limited to, word processing, spreadsheet management, email exchange, and Internet browsing. These applications are executed on an operating system installed on the PC. Traditionally, there have been only a limited number of operating systems that are available for PCs, for example, Windows™, MAC OS®, and Linux™, which are the predominant operating systems.

Recently, however, the popularity of newly developed computing devices has resulted in the introduction of new operating systems (e.g., iOS® by Apple®, Android® by Google™, Windows RT, BlackBerry® OS, Chrome OS, and the like). Such operating systems have been developed to be installed primarily on mobile computing devices, such as smart phones, tablet computers, and the like. These devices are also capable of executing software applications (also known as Apps) on the operating system of the device.

For example, the Android® OS is based on Linux® OS kernel for core system services such as security, memory management, process management, network stack, and driver model. The kernel also acts as an abstraction layer between the hardware and upper layers of the Android OS. These layers include a set of C/C++ libraries used by various components of the Android OS, a runtime, and an application framework that provides an interface between the applications and the operating system's functions. As a result, an application, e.g., Microsoft® Word® 2010, developed for Windows-based operating systems, cannot be executed on an Android OS. This limits the user to a set of applications developed specifically for a certain type of operating system. That is, a user of a smart phone equipped with an Android OS is limited to accessing and running only applications developed for this type of an operating system.

Software applications, regardless of the type of operating system, are typically installed and set up using an automated installation program. The installation program is designed to enable the integration of the new functionality into the operating system, as well as to ensure that the application can be easily removed.

Application virtualization technology allows the execution of software applications inside an isolated virtual environment having its own virtual file system and virtual registry. That is, execution of such applications will not conflict with or impact other applications that may coexist in the virtual environment.

Typically, an operating system executed on PCs, such as Microsoft® XP®, Microsoft Vista®, Microsoft® Windows 7, Microsoft® Windows 8, and the like includes a registry file for storing the operating system, user, and application settings, as well as a record of dynamic link libraries (DLLs) which contain shared code to be used, and named objects for naming functions shared by different processes. The structure of Windows-based operating systems is incompatible with other types of operating systems, such as those designed for execution on mobile devices.

In addition, PC operating systems operate in conjunction with a file system. For example, a new technology file system (NTFS) is the standard file system for Windows XP®, Windows Server® 2003, Windows Server® 2008, Windows Server® 2012, Windows Vista®, Windows 7 and Windows 8 operating systems. The non-Windows based operating systems often do not support such file system. Thus, it may not be possible to save files in a structure of folders and sub-folders, such as provided by the NTFS. Furthermore, in many cases, users of mobile computing devices rely on cloud storage services provided by, e.g., Dropbox™, SkyDrive, and the like, to store their files.

Currently, there are no available solutions that enable an execution of a software application across different operating systems. Specifically, there is no solution that enables the execution of Windows-based OS applications on devices installed with a non-Windows based OS, while providing seamless interface to a cloud storage service instead of performing file system operations locally on the server or client's device.

Therefore, it would be advantageous to provide an efficient solution to overcome the shortcomings of currently available operating systems.

SUMMARY

Certain embodiments of the disclosed herein include a method for cross-operating systems execution of a legacy software application on a user computing device. The method comprises upon launching a native application on the user computing device, executing, on a server, a cloudified application corresponding to the legacy software application, the legacy software application is compliant with a first operating system, wherein the user computing device is compliant with a second operating system; the first operating system and the second operating system are incompatible with each other; rendering outputs responsive of inputs generated by the native application and received at the cloudified application; streaming the rendered outputs to the user computing device to be displayed by the native application; and performing file system operations requested by at least one of the native application and the cloudified application on at least one of a cloud storage service.

Certain embodiments of the invention also include a system for cross-operating systems execution of a legacy software application over a user computing device. The system comprises an interface module configured to receive inputs generated by a native application and stream outputs respective of the inputs to the native application; a session module configured to execute a cloudified application corresponding to the legacy software application, the legacy software application is compliant with a first operating system, the session module is further configured to render outputs responsive of the inputs provided by the interface module, wherein the user computing device is compliant with a second operating system; the first operating system and the second operating system are incompatible with each other; and a cloud storage module configured to interface with at least one of a cloud storage service, thereby allowing the cloudified application to perform system operations requested by the native application on the at least one cloud storage service.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
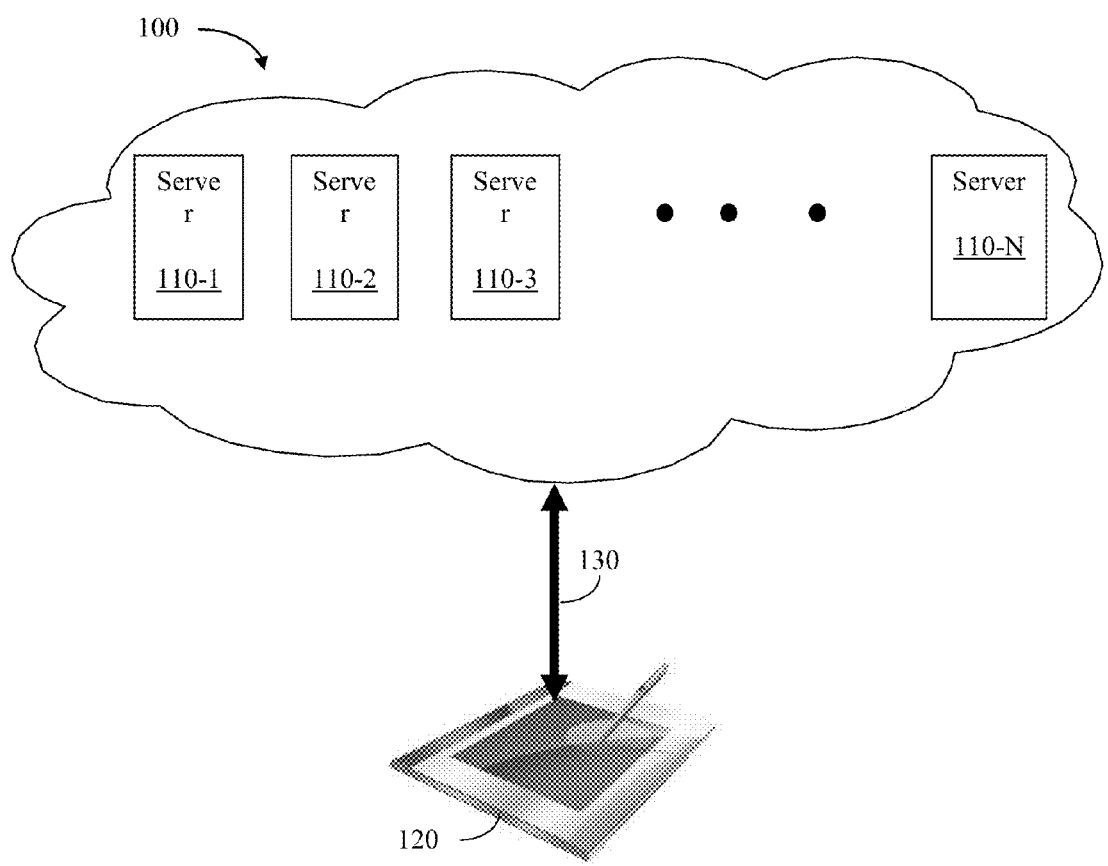
FIG. 1 is a diagram illustrating a computer network system useful in describing certain embodiments disclosed herein.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments discussed herein enable the execution of software applications compliant with a first type of operating system on computing devices running a second type of operating system, where the first and second operating systems are incompatible with each other. In one embodiment, the first type of operating system is any one of Windows XP®, Windows Server® 2003, Windows Server® 2008, Windows Server® 2012, Windows Vista®, Windows 7, and Windows 8 operating systems. The second type of operating system is any one of MacOS®, Linux, iOS®, Android®, Windows Phone OS, Windows® RT, BlackBerry® OS and ChromeOS.

FIG. 1 shows a diagram illustrating a system 100 useful in describing various embodiments of the invention. In the system 100, a plurality of servers 110-1 to 110-N can be accessed by a computing device 120 through a network connection 130. Each of the plurality of servers 110-1 to 110-N allows the execution of software applications across different types of operating systems. In one embodiment, the computing device 120 is a mobile computing device including, for example, a smart phone, a tablet computer, a PDA, and the like that runs a non-Windows-based operating system as opposed to a Windows-based OS designed for servers and PCs (hereinafter "Windows-based OS). According to an exemplary embodiment, the computing device 120 runs an operating system that may be one of, for example, MacOS®, Apple iOS, Android® OS, BlackBerry® OS, ChromeOS, Windows Phone OS, Windows® RT, Linux, and the like.

For the sake of simplicity, only one computing device 120 is shown in FIG. 1. However, it should be appreciated that the system 100 typically includes a plurality of computing devices of users who can access the servers 110-1 to 110-N. The network connection 130 may be, but is not limited to, a local area network (LAN) connection, a wide area network (WAN) connection, a cellular network, such as 3G or LTE, or any combination thereof.

The plurality of servers 110-1 to 110-N is deployed in one or more datacenters that can provide cloud computing services. The cloud computing services may be realized through network infrastructures including, for example, a private cloud, a public cloud, or a combination thereof. In a private cloud configuration, servers are typically deployed in one or more datacenters within an organization. In one embodiment, the private cloud can include an enterprise content management system, such as, but not limited to, Microsoft® SharePoint, EMC Documentum®, a provider network, or direct-attached storage devices.

As mentioned above, in accordance with an embodiment, the computing device 120 can run one or more software applications designed to be compatible with Windows-based operating systems, such as those mentioned above. One of ordinary skill in the art will recognize that Windows-based operating systems are incompatible with at least the iOS®, Android®, Mac OS®, and ChromeOS®.

For the sake of discussion and without limiting the scope of the disclosed embodiments, software applications designed to be compliant with Windows-based operating systems will be also referred to hereinafter as "legacy applications". Examples of such legacy applications include the various versions of Microsoft® Word®, Excel®, PowerPoint®, Outlook®, Visio®, Publisher, and the like, as well as Microsoft Internet Explorer®, Flash® applications, Java® applications, and Silverlight® applications. Furthermore, the legacy applications also include numerous in-house legacy applications developed merely to be compatible with Windows® that are too costly or not feasible to re-write for other operating systems, and so on. Software applications executed on operating systems not compatible with the Windows-based OS, such as iOS®, Android®, Mac OS® and ChromeOS®, will be also be referred to hereinafter as "native applications".

Typically, native applications are downloaded from a central repository (marketplace). An example for such a repository includes, e.g., Android Marketplace, Google Play, and Apple® Store, as well as private corporate application stores. As will be discussed in detail below, each of servers 110-1 to 110-N is configured to execute a virtualized cloud version of a legacy application. Such applications will also be referred to hereinafter as "cloudified applications". A process for generating a cloudified application from a legacy application is discussed below.

According to one embodiment, a native application is downloaded from the central repository and displayed as an App icon on a display of the computing device 120. The native application corresponds to the legacy application (and hence to the cloudified application) to be executed. The user, by clicking on the icon, causes the execution of the cloudified application on at least one server 110, while the outputs (e.g., screens) rendered by the execution of the cloudified application are streamed to the computing device 120 and displayed. As a result, the user enjoys the full functionality of the legacy application as if it had been executed locally on the device 120. The native application may include, for example, a set of permissions given to a user, an address of at least one server 110 that can run the corresponding cloudified application, and so on. In another embodiment, the execution of the cloudified application is launched through a browser of the computing device 120, where the outputs rendered respective of such execution are displayed in the browser using, for example, a HTML5 web standard.

It should be noted that the native application is not a re-programmed or re-engineered version of the legacy application configured to be compatible with the operating system of the device 120. Rather, as will be described herein, the native application invokes a cloudified application corresponding to the legacy application that is executed on one or more of the servers 110-1 to 110-N, where rendered outputs are streamed to the native application on the computing device 120 over the network 130, by means of, for example, HTTP or HTTPS. Again, for the user, it appears as if the legacy application is actually being executed on the device 120.

Figure 2A:
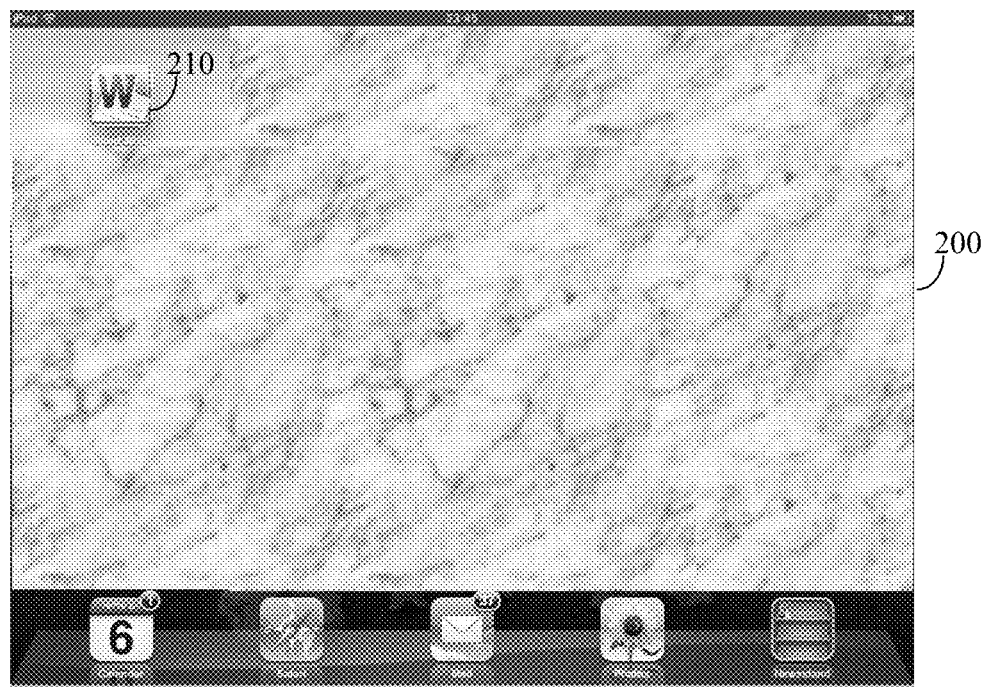
FIGS. 2A, 2B, and 2C are exemplary screen shots rendered according to certain embodiments disclosed herein.
Figure 2B:
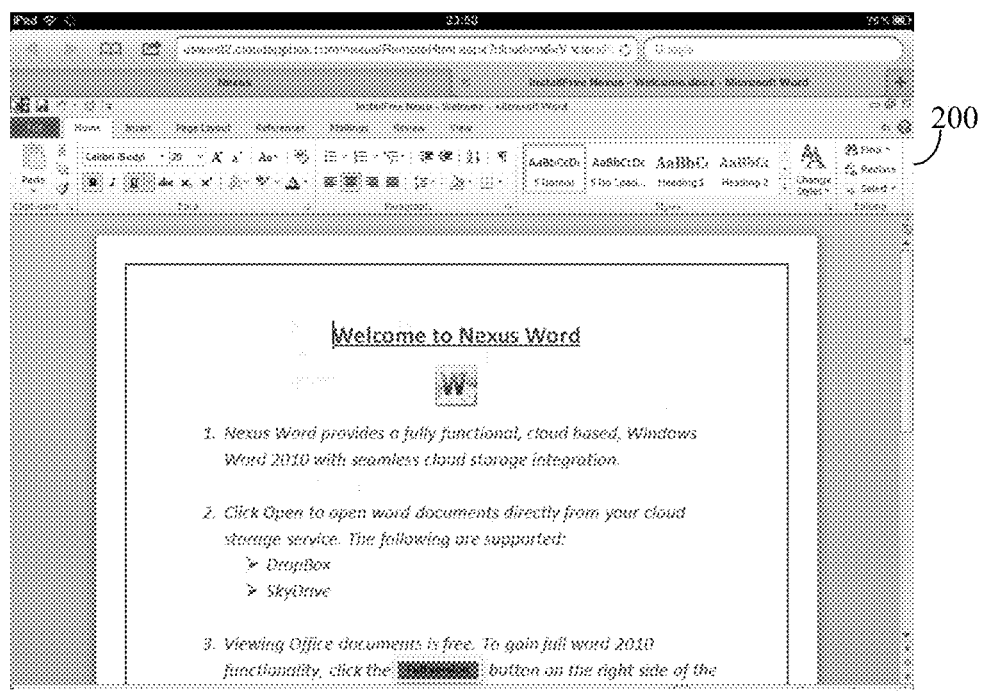

As an example, the legacy application Microsoft® Word 2010 is executed on a tablet computer. As shown in FIG. 2A, an icon 210 of the native Word application is placed on the tablet's display 200, the same as is the case with any other App. Tapping on the icon 210 triggers the launch of a corresponding Microsoft® Word application on a server 110, and a newly opened Word document is displayed on the computing device 120, as shown in FIG. 2B. As can be noticed, the user interface and the functionality is as if a Word application has been executed on a PC that runs a Windows-based OS. The user can open, review, edit, and save the Word document.

Figure 2C:
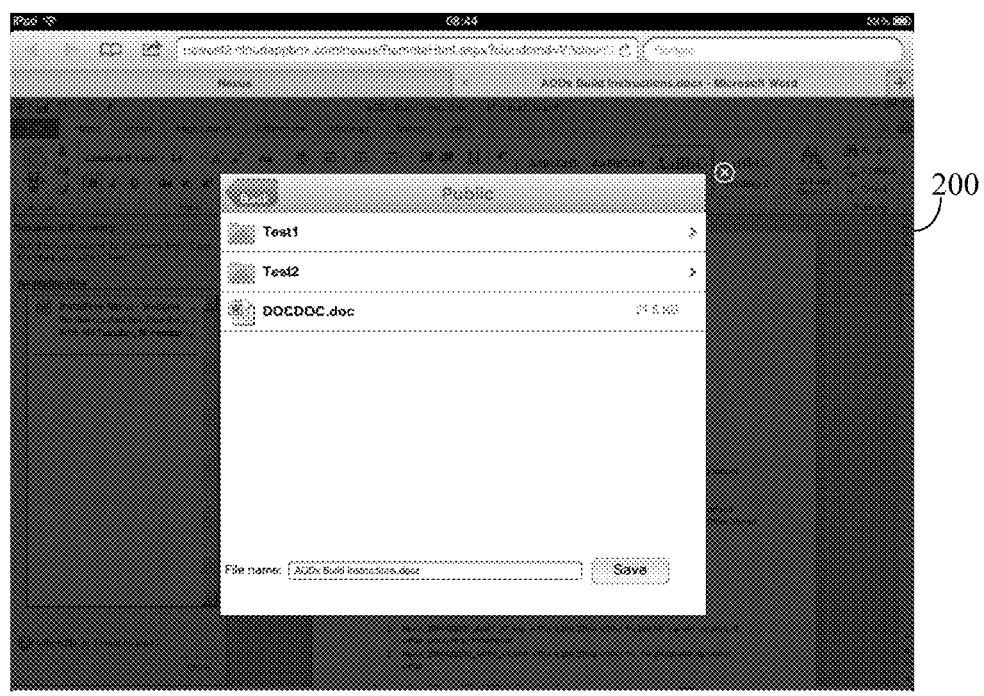

A server 110-i (i=1 to N) hosts a cloudified application version of the Word application, and every input from the device is communicated to the server 110-i over the network 130. The captured inputs include, for example, location of the cursor, any character typed using the keyboard or the virtual keyboard, a selection of a task from the toolbar (e.g., opening a file, changing font size, color, applying track change options), and so on. The server 110-i processes the received input and renders a new output display that is communicated to the native application running on the tablet computer utilized in this instance. For example, as shown in FIG. 2C, upon selection by a user to open a document, a dialog box is displayed to the user on the tablet computer, and the selection is communicated to the server 110-i.

In an embodiment of the invention, discussed in detail below, the server 110-i provides a transparent access to a file system of one or more cloud storage services, which may include, but is not limited to a private cloud, a public cloud, a hybrid cloud, and any combination thereof that is accessed to retrieve and/or store user files.

A cloudified application is a virtual software application (virtualized application) of the legacy application. In one embodiment, the virtual software application includes the following files: a virtual engine and an application on demand (AOD) file. In certain implementations, the virtual software application may also include a user data file. A user data file contains all the personalization and customization data that the legacy application would have written into system files of the operating system. The user data file can also contain add-ins that were installed by the user while working on a virtual application, such as modified toolbars, preferences, temporary files, registry changes, user files (e.g., documents, music, video, etc.), and so on. User data files may also be encrypted. The virtual engine is an executable computing environment with its own read/write file system and registry, dynamic link library (DLL) repositories, and named objects.

An AOD file includes all of the resources that a virtual software application needs in order to run within the virtual environment. That is, an AOD file includes an internal virtual services manager, a digital rights management layer, a connectivity layer, and a protection layer. The protection layer seals the virtual software application from the environment of the host operating system of the server 110-i (i.e., the server executing the cloudified application), thereby providing the virtual application, hence the cloudified applications, with the required function calls and returned data to prevent any data from being written to the host operating system. The connectivity layer enables the virtual application to communicate with other applications and define the integration with the operating system shell. For example, the connectivity layer includes registry keys and files that contain shell components, such as file extensions, a programs' files links, system tray, quick launch, and so on. The AOD files, virtual engines, and user files are of cloudified applications that are maintained by the plurality of servers 110-1 to 110-N. In one embodiment, the AOD files can be generated by means of an Encapsulator described in greater detail in a co-pending U.S. patent application Ser. No. 12/419,030 filed Apr. 6, 2009, the contents of which are incorporated by reference herein in their entirety.

Figure 3:
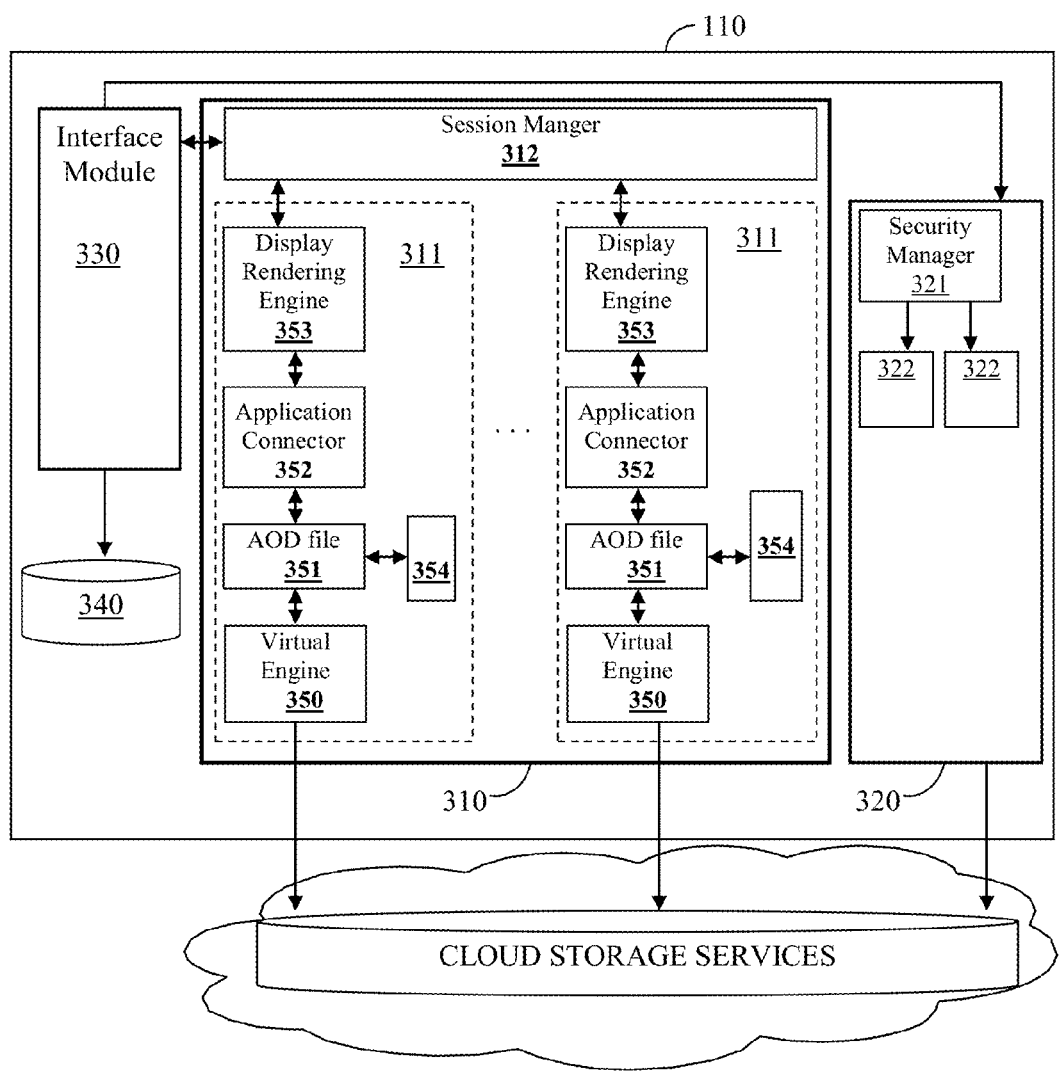
FIG. 3 is a block diagram of a server configured to enable the cross-OS execution of software applications.

FIG. 3 shows an exemplary and non-limiting block diagram of a server 110 according to an embodiment. The server 110 may be any of servers 110-1 to 110-N shown in FIG. 1. The server 110 enables the execution of legacy applications across different types of operating systems. To this end, the server 110 runs a cloudified application corresponding to a legacy application. It should be noted that the cloudified application allows the server 110 to run an application that would not have been executed if it was natively installed on the user's computing device (e.g., device 120).

The server 110 includes a session module 310, a cloud storage module 320, an interface module 330, and a database 340. The session module 310, for each cloudified application executed by the server 110, creates, manages, and terminates HTTP or HTTPS sessions with one or more computing devices.

The cloud storage module 320 interfaces between cloudified applications and the one or more cloud storage services of users, and authenticates the computing devices when necessary to allow access to such services. The cloud storage services 370 may be provided by third party vendors, such as Dropbox™, SkyDrive, and Amazon S3. In one embodiment, the cloud storage module 320 includes a security manager 321 that provides authentication services to the interface module 330. That is, the security manager 321 receives from the module 330 a name of a cloud storage service, as well as a username and a password or other credentials necessary (e.g., two-factor authentication, certificate, etc.) to access the service, and determines if the user is authorized to access the requested service. The cloud storage module 320 also includes a plurality of plug-ins 322, each of which interfaces with a different cloud storage provider. A cloud plug-in is an abstract file manager layer that allows the interface module 330 to perform file system operations on the cloud storage service.

The cloud storage module 320 receives, as an input from interface module 330, a required cloud storage service request (e.g., Dropbox), and the username and password or other credentials. Then, a plug-in 322 corresponding to the requested cloud service is initiated and authentication of the user's credentials against the service provider is performed to obtain a connection Token. Once a connection is established with the cloud storage service, file system operations can be performed on the cloud storage service's operating system. Such operations include, for example, folder drill down, file open, file save, and so on.

The interface module 330 interfaces between each cloudified application executed by the session module 310 and the respective native application running on the computing device (e.g., the computing device 120). To this end, the interface module 330 transmits inputs of the native application from the computing device to the server 110 and transmits the outputs (e.g., screen image pixels, changes in screen pixels) rendered by the session module 310 to the computing device. In addition, the interface module 330 provides a view of the various cloud storage services. That is, when a certain cloud storage service is accessed by a cloudified application, the exact same graphic user interface (GUI) of the accessed storage service is rendered by the interface module 330 to be displayed by the native application on the computing device. In another embodiment, a GUI providing a common interface to all cloud storage services is generated and displayed on the computing device. As mentioned above, an access to a cloud storage service is performed through the cloud storage module 320.

The database 340 includes users' credentials for using each of the cloudified applications and for accessing their cloud storage services. In certain implementations, the database 340 may be a standalone system connected to the server 110.

The session module 310 includes a plurality of sessions 311, each of which is an instance of a cloudified application. The module 310 also includes a session manager 312 acting as a proxy for sessions 311. When a user launches a native application corresponding to a legacy application, the session manager 312 assigns a unique session identification (ID) number and allocates a new session to the computing device. Each session 311 includes a virtual engine 350, an AOD file 351, an application connector 352, a display rendering engine 353, and a user data file 354.

The virtual engines 350, AOD file 351, and user data file 354 are all elements of the cloudified application described in detail above. The virtual engine 350 executes the cloudified application based on the application's resources and the user data contained in the AOD file 351, as well as the user data files 354. The virtual engine 350 executes the application in a sealed environment on the host operating system (not shown) of the server 110. That is, a cloudified application executed by the virtual engine 350 of one session can share hardware resources of the server 110 with other sessions. A detailed discussion on the operation of the virtual engine 350 can be found in U.S. Pat. No. 7,913,252 filed Apr. 6, 2007 and U.S. Pat. No. 8,078,649 filed Apr. 6, 2007, the contents of which are incorporated by reference herein in their entirety.

The virtual engine 350 also interacts directly with one or more of the cloud storage services to perform file system operations. The application connector 352 handles the standard input/output tasks for an executed cloudified application. For different cloudified applications, different application connectors may be provided.

The display rendering engine 353 generates the screen's bitmaps to be displayed by the native application running on the user's computing device, e.g., the computing device 120. Examples of such bitmaps are provided in FIG. 2B. The bitmaps are the outputs resulting from executing the cloudified application in response to the user's inputs. According to one embodiment, the rendering engine 353 renders only the differences between a previous bitmap and current bitmap. The bitmaps and/or their differences are streamed to the computing device 120 by the interface module 330. In one embodiment, the bitmaps and/or their differences are compressed. The compression may be achieved using any lossless data compression algorithm discussed in the related art.

Figure 4:
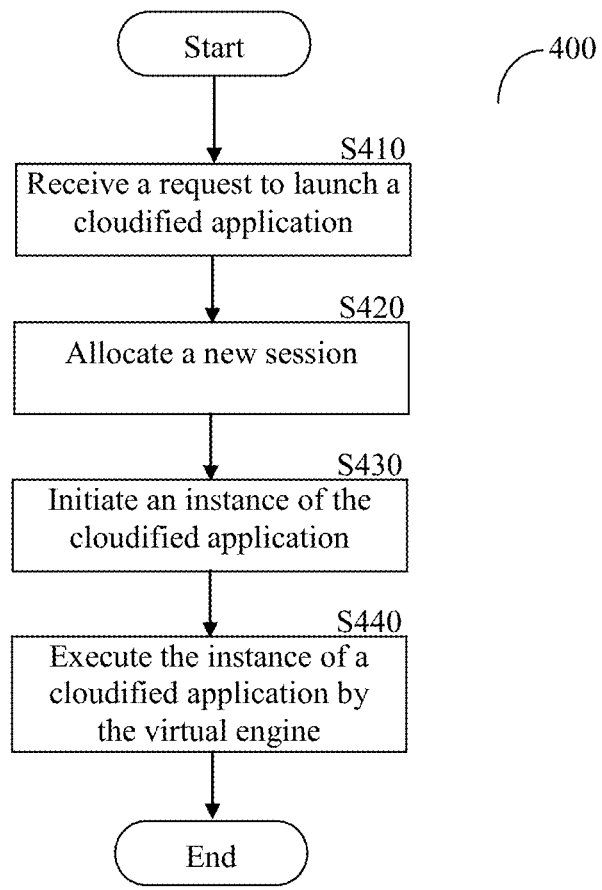
FIG. 4 is a flowchart describing the operation of a server executing a cloudified application according to one embodiment.

FIG. 4 is an exemplary and non-limiting diagram for the operation of the server 110 according to one embodiment. When a native application is launched, a request is sent to the server 110 to execute a cloudified application that corresponds to the native application. The request is directed to one of the servers 110-1 and 110-N based on information contained in the native application. The request that is sent to the server 110 may also include user information sent from the computing device.

At S410, the request is received by the interface module 330 and then forwarded to the session manager 312. At S420, the session manager 312 allocates a new session and assigns a unique session ID number associated with the new session. The session ID is sent to the interface module 330 for communicating with the new session. At S430, an instance of the cloudified application in the new session is instantiated. This includes initiating the virtual engine to execute the applications' resources in the AOD file, the display rendering engine for the session, and the cloud connector.

Thereafter, at S440, the virtual engine in the new session causes the execution of the cloudified application. During the execution of this application, inputs are received from the native application, and sent to the application connector through the interface module 330 for processing by the virtual engine. Outputs in the form of screen bitmaps (or differences thereof) are streamed to the native application through the module 330. If during the execution of the cloudified application, an access to a file system is made, the virtual engine accesses the user's cloud storage service to perform the operating system file operation.

The teachings disclosed herein provide a transparent access to a cloud storage file system directly from the cloudified applications. This allows, for example, a Windows-based software application to perform file system operations on a cloud storage file system instead of the NTFS. To this end, the server 110 hijacks system calls for file system operations (e.g., 'file open' and 'save as', etc.) and redirects such calls to a file system of the cloud storage service. In addition, the server 110 translates, in runtime, local Windows-based OS file management application programming interface (API) calls into API calls that are provided by a cloud storage service. This provides a way to benefit from Windows-based OS file management algorithms, such as caching and streaming capabilities even when performing operations on a file system of a cloud storage service, e.g., Dropbox™.

Figure 5:
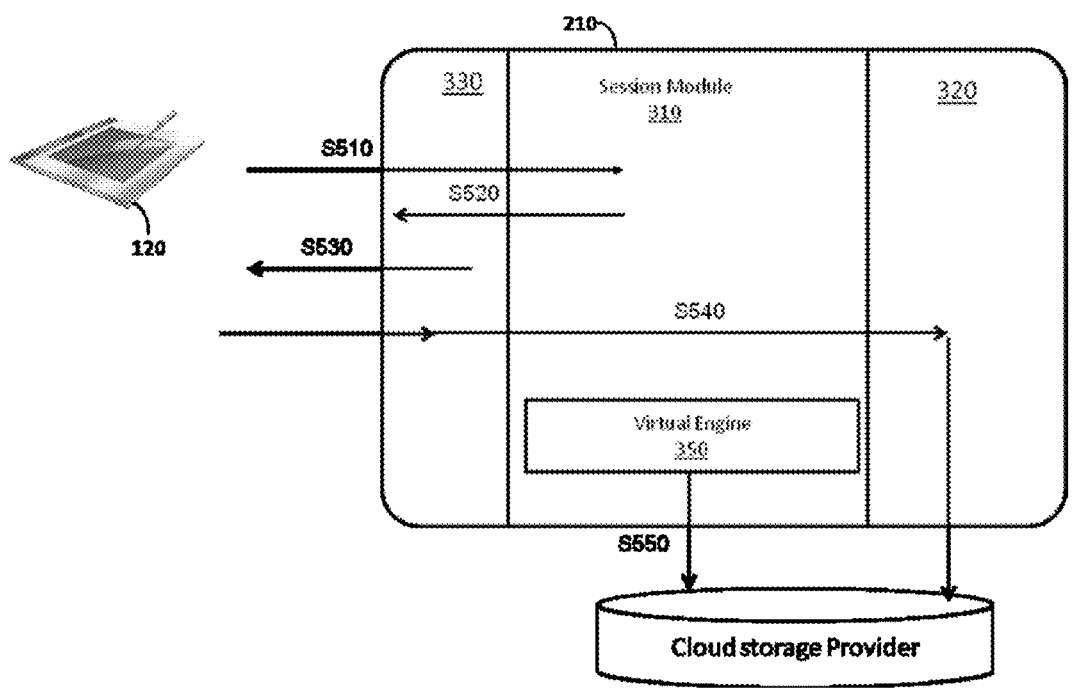
FIG. 5 is a diagram illustrating the transparent access to a cloud storage file system.

A process for enabling a transparent access to a file system of a cloud storage provider, according to an embodiment of the invention, is illustrated in FIG. 5. At S510, an input from the user is identified, by the session module 310, as a request to perform a file system operation. For example, a click on an 'open' file command button (or icon) means that the file system operation file->open should be performed.

At S520, the session module 310 identifies the type of the requested file system operation and provides the interface module 330 with the corresponding type of operation and a set of parameters. For example, the operation may be file->open and its parameters may include a list of file extensions (e.g., .docs, .xlsx, etc.).

At S530, based on the request from the session module 310, the interface module 330 creates a dialog box being displayed on the computing device's 120 display. The dialog box may be in the form of a web page (e.g., an active server page (ASP)) that uses a cloud storage module 320 to communicate with an API provided by the cloud storage provider. For example, a dialog box for a file->open operation may include a list of folders in the cloud storage. The cloud storage module 320 communicates with the cloud storage provider as discussed above. When the user browses through cloud folders, new content is retrieved by the module 320 and the dialog box is updated by the interface module 330 (S540).

At S550, when the user selects a document to open, the virtual engine 350 in the session module 310 connects to the Windows file system to launch the actual file system operation requested by the user, with the cloud storage equivalent of the same command. Thus, the virtual engine 350 provides a translation layer between the cloud storage file system application programming interface (API) and the Windows applications' file system API. This triggers the execution of the requested operation. For example, a user selection of "open file" causes a display of a document saved in the cloud storage (and not in the server's 210 local storage) to be opened and displayed on the computing device 120. The document is directly retrieved from the cloud storage service. It should be noted that subsequent file system operations are performed in the same manner as the above-described process. It should be further be noted that the file system operation can also be requested by the cloudified application, for example, an auto-save operation of an open document. The file system operation requested as the cloudified application is handled in the same manner as discussed above.

The various embodiments disclosed herein can be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for cross-operating systems execution of a legacy software application on a user computing device, comprising:
    responsive to a native application having been launched on the user computing device, executing, on a server, a virtualized cloud version of the legacy software application, wherein the legacy software application is compliant with a first operating system, the user computing device is compliant with a second operating system, and the first operating system and the second operating system are incompatible with each other;
    at the server, having the virtualized cloud version of the legacy software application act on inputs that were generated by the native application and that were transmitted to the server;
    at the server, rendering image outputs responsive to the virtualized cloud version of the legacy software application acting on the inputs;
    at the server, streaming the rendered image outputs to the user computing device to be displayed on the user computing device by the native application; and
    performing file system operations on a cloud storage service, the file system operations requested by at least one of the native application and the virtualized cloud version of the legacy software application,
    wherein the native application corresponds to the legacy software application and includes a set of permissions granted to a user of the computing device and an address of the server, and the virtualized cloud version of the legacy software application includes a user data file containing personalization and customization information of the user of the computing device.

2. The method of claim 1, wherein the cloud storage service includes at least one of: a private cloud, a public cloud, and a hybrid cloud.

3. The method of claim 1, further comprising:
    hijacking a system call for a file system operation initiated by the virtualized cloud version of the legacy software application;
    translating the hijacked system call and its parameters to an application programming interface (API) call of the cloud storage service; and
    redirecting the API call to the cloud storage service.

4. The method of claim 3, wherein the file system operation is compatible with a file system of the first operating system.

5. The method of claim 4, wherein the translation to the API call is performed in runtime.

6. The method of claim 1, wherein rendering the image outputs comprises:
    capturing two bitmap digital images generated consecutively by the virtualized cloud version of the legacy software application; and
    rendering a difference bitmap from the two consecutively captured bitmap digital images by subtracting an earlier of the two bitmap digital images from a later of the two bitmap digital images.

7. The method of claim 6, further comprising:
    compressing the difference bitmap prior to the streaming of the rendered image outputs.

8. The method of claim 7, wherein streaming the rendered image outputs includes:
    streaming the compressed difference bitmap to the user computing device over a hypertext transfer protocol (HTTP) connection or a HTTP secure (HTTPS) connection.

9. The method of claim 1, wherein the first operating system is any one of: Windows XP, Windows Server 2003, Windows Server 2008, Windows Server 2012, Windows Vista®, Windows 7 and Windows 8; and the second operating system is any one of: iOS, Android, and ChromeOS, Windows RT, BlackBerry OS, MacOS, and Linux.

10. The method of claim 1, wherein the virtualized cloud version of the legacy software application includes a virtual engine, and an application-on-demand (AOD) file.

11. The method of claim 10, wherein executing the virtualized cloud version of the legacy software application further comprises:
receiving a request from the computing device when the native application is launched;
instantiating a new instance of the virtualized cloud version of the legacy software application in a new session; and
initiating the virtual engine, thereby causing the execution of the virtualized cloud version of the legacy software application.

12. A non-transitory computer readable medium having stored thereon computer executable code that when executed causes a server to perform a process for cross-operating systems execution of a legacy software application on a user computing device, the process comprising:
responsive to a native application having been launched on the user computing device, executing, on a server, a virtualized cloud version of the legacy software application, wherein the legacy software application is compliant with a first operating system, the user computing device is compliant with a second operating system, and the first operating system and the second operating system are incompatible with each other;
having the virtualized cloud version of the legacy software application act on inputs that were generated by the native application and that were transmitted to the server;
rendering image outputs responsive to the virtualized cloud version of the legacy software application acting on the inputs;
streaming the rendered image outputs to the user computing device to be displayed on the user computing device by the native application; and
performing file system operations on a cloud storage service, the file system operations requested by at least one of the native application and the virtualized cloud version of the legacy software application,
wherein the native application corresponds to the legacy software application and includes a set of permissions granted to a user of the computing device and an address of the server, and the virtualized cloud version of the legacy software application includes a user data file containing personalization and customization information of the user of the computing device.

13. The non-transitory computer readable medium of claim 12, wherein the virtualized cloud version of the legacy software application includes a virtual engine, and an application-on-demand (AOD) file.

14. A server for cross-operating systems execution of a legacy software application on a user computing device, comprising:
a processor; and
a memory, the memory containing instructions that, when executed by the processor, configure the server to:
responsive to a native application having been launched on the user computing device, execute, on the server, a virtualized cloud version of the legacy software application, wherein the legacy software application is compliant with a first operating system, the user computing device is compliant with a second operating system, and the first operating system and the second operating system are incompatible with each other;
have the virtualized cloud version of the legacy software application act on inputs that were generated by the native application and that were transmitted to the server;
render image outputs responsive to the virtualized cloud version of the legacy software application acting on the inputs;
stream the rendered image outputs to the user computing device to be displayed on the user computing device by the native application; and
perform file system operations on a cloud storage service, the file system operations requested by at least one of the native application and the virtualized cloud version of the legacy software application,
wherein the native application corresponds to the legacy software application and includes a set of permissions granted to a user of the computing device and an address of the server, and the virtualized cloud version of the legacy software application includes a user data file containing personalization and customization information of the user of the computing device.

15. The server of claim 14, wherein the server is further configured to:
hijack a system call for a file system operation initiated by the virtualized cloud version of the legacy software application;
translate in runtime the hijacked system call and its parameters to an application programming interface (API) call of the cloud storage service; and
redirect the API call to the cloud storage service.

16. The server of claim 14, wherein the server is further configured to:
receive a request from the computing device when the native application is launched;
instantiate a new instance of the virtualized cloud version of the legacy software application; and
initiate a virtual engine included in the virtualized cloud version of the legacy software application, thereby causing the execution of the virtualized cloud version of the legacy software application.

17. The server of claim 14, wherein the server is further configured to:
capture two bitmap digital images generated consecutively by the virtualized cloud version of the legacy software application;
render a difference bitmap from the two consecutively captured bitmap digital images by subtracting an earlier of the two bitmap digital images from a later of the two bitmap digital images; and
compress the difference bitmap prior to the streaming of the rendered image outputs.

18. The server of claim 17, wherein the server is further configured to:
stream the difference bitmap to the user computing device over a hypertext transfer protocol (HTTP) connection or a HTTP secure (HTTPS) connection.

19. The server of claim 14, wherein the virtualized cloud version of the legacy software application includes a virtual engine, and an application-on-demand (AOD) file.

* * * * *